US012784123B2

(12) United States Patent
Wang et al.

(10) Patent No.: US 12,784,123 B2
(45) Date of Patent: Nov. 3, 2026

(54) GRAPHICS PROCESSING UNIT, CHIP, AND ELECTRONIC DEVICE

(71) Applicant: VeriSilicon Microelectronics (Shanghai) Co., Ltd., Shanghai (CN)

(72) Inventors: Chao Wang, Shanghai (CN); Huiming Zhang, Shanghai (CN); Yongjun Chen, Shanghai (CN); Rong Lu, Shanghai (CN)

(73) Assignee: VeriSilicon Microelectronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/567,786

(22) PCT Filed: Dec. 23, 2022

(86) PCT No.: PCT/CN2022/141286
§ 371 (c)(1),
(2) Date: Dec. 7, 2023

(87) PCT Pub. No.: WO2024/130683
PCT Pub. Date: Jun. 27, 2024

(65) Prior Publication Data
US 2025/0307975 A1 Oct. 2, 2025

(51) Int. Cl.
*G06T 1/20* (2006.01)

(52) U.S. Cl.
CPC .................................... *G06T 1/20* (2013.01)

(58) Field of Classification Search
CPC ........................................................ G06T 1/20
See application file for complete search history.

(56) References Cited

U.S. PATENT DOCUMENTS

| | | | | |
|---|---|---|---|---|
| 10,812,079 | B2 * | 10/2020 | Bisht | G06F 30/394 |
| 2017/0256017 | A1 * | 9/2017 | Gandhi | G06T 1/60 |
| 2021/0049729 | A1 * | 2/2021 | Paltashev | G06T 15/005 |
| 2022/0383445 | A1 | 12/2022 | Lee | |

* cited by examiner

*Primary Examiner* — Xiao M Wu
*Assistant Examiner* — Ahmed Taha
(74) *Attorney, Agent, or Firm* — IPRTOP LLC

(57) ABSTRACT

The present disclosure provides a graphics processing unit, a chip, and an electronic device. The graphics processing unit includes at least two data-and-command dispatchers and at least two graphics processing unit cores, each data-and-command dispatcher is connected to at least one graphics processing unit core, and one of the data-and-command dispatchers is connected to one of the graphics processing unit core through a set of data-and-command transmission lines; The graphics processing unit is configured to provide at least one virtual graphics processing unit, and each virtual graphics processing unit includes one data-and-command dispatcher and some or all of the graphics processing unit cores connected to the data-and-command dispatcher. The graphics processing unit can provide at least one virtual graphics processing unit, and the graphics processing unit can be shared by multiple users in a manner of virtualization of the graphics processing unit.

14 Claims, 9 Drawing Sheets

GRAPHICS PROCESSING UNIT, CHIP, AND ELECTRONIC DEVICE

FIELD OF TECHNOLOGY

The present disclosure belongs to the technical field of processing units and relates to a graphics processing unit, in particular to a graphics processing unit, a chip, and an electronic device.

BACKGROUND

A graphics processing unit (GPU), also known as a display core, a visual processing unit, and a display chip, is a microprocessor dedicated to performing image and graphics-related operations on a personal computer, a workstation, a game machine, and some mobile devices (such as tablets, smartphones, etc.). The GPU enables the graphics card to reduce the dependence on a central processing unit (CPU) and to complete part of the original operation of the CPU.

The number of graphics processing units of an electronic device is usually limited. To more efficiently utilize limited graphics processing units to better meet user demands, graphics processing unit virtualization technologies have been developed. The graphics processing unit virtualization requires that an actual graphics processing unit can be virtualized into multiple virtual graphics processing units to achieve simultaneous use of multiple users. Each user uses one virtual graphics processing unit, and each virtual graphics processing unit may use one or more graphics processing unit cores. However, in the prior art, graphics processing unit cores used by virtual graphics processing units are always fixed and are difficult to flexibly configure according to actual demands.

SUMMARY

The present disclosure provides a graphics processing unit, a chip, and an electronic device. In the graphics processing unit, graphics processing unit cores included in each virtual graphics processing unit may be configured according to actual demands.

According to a first aspect, the present disclosure provides a graphics processing unit, wherein the graphics processing unit includes at least two data-and-command dispatchers and at least two graphics processing unit cores, each data-and-command dispatcher is connected to at least one graphics processing unit core, and one of the data-and-command dispatchers is connected to one of the graphics processing unit cores through a set of data-and-command transmission lines; the graphics processing unit is configured to provide at least one virtual graphics processing unit, and each virtual graphics processing unit includes one of the data-and-command dispatchers and some or all of the graphics processing unit cores connected to the data-and-command dispatcher.

In an embodiment of the first aspect, the graphics processing unit is configured to provide n virtual graphics processing units according to a received instruction, where n is any positive integer less than or equal to N, and N is the number of the graphics processing unit cores.

In an embodiment of the first aspect, the i-th data-and-command dispatcher of the graphics processing unit is connected to floor $(N/n_i)$ graphics processing unit cores, where i and $n_i$ are both positive integers less than or equal to N, and floor is a downward rounding function.

In an embodiment of the first aspect, the graphics processing unit includes N data-and-command dispatchers, one of the data-and-command dispatchers is connected to N graphics processing unit cores, $m_j$-$m_{j+1}$ of the data-and-command dispatchers are connected to $N/m_j$ graphics processing unit cores, where $m_j$ and $m_{j+1}$ are adjacent positive integers capable of being divided by N, and $1 \le m_{j+1} \le m_j \le N$.

In an embodiment of the first aspect, the graphics processing unit further includes a data selector, and the graphics processing unit core connecting with at least two data-and-command dispatchers is connected to the data-and-command dispatchers through the data selector.

In an embodiment of the first aspect, both the number of the data-and-command dispatchers and that of the graphics processing unit cores is 8, and the connection method between the data-and-command dispatchers and the graphics processing unit cores includes 1 one-to-eight connection, 1 one-to-four connection, 2 one-to-two connections, and 4 one-to-one connections.

In an embodiment of the first aspect, the number of physical layers of the graphics processing unit is configured according to the number of data-and-command transmission lines.

In an embodiment of the first aspect, the data-and-command dispatchers are fully connected to the graphics processing unit cores.

According to a second aspect, the present disclosure provides a chip, wherein the chip includes the graphics processing unit according to any one of embodiments of the first aspect and input/output pins.

According to the second aspect, the present disclosure provides an electronic device, wherein the electronic device includes the graphics processing unit according to any one of embodiments of the first aspect and a memory.

The graphics processing unit can provide at least one virtual graphics processing unit, and graphics processing unit cores included in each virtual graphics processing unit may be configured according to actual demands. Thus, in the specific application, graphics processing unit cores included in the virtual graphics processing unit may be flexibly configured according to actual demands.

In some embodiments of the present disclosure, by optimizing the connection method between the data-and-command dispatchers and the graphics processing unit cores, it is possible to reduce the number of connection lines between the data-and-command dispatchers and the graphics processing unit cores, avoiding the congestion problem of chips in place and route (P&R) stage, and facilitating the reduction of the chip area. Further, in some embodiments, the number of physical layers of the graphics processing unit is configured according to the number of data-and-command transmission lines. In these embodiments, by optimizing the connection method between the data-and-command dispatchers and the graphics processing unit cores, it is possible to realize the reduction of the number of physical layers of the graphics processing unit.

REFERENCE NUMERALS

Figure 1:
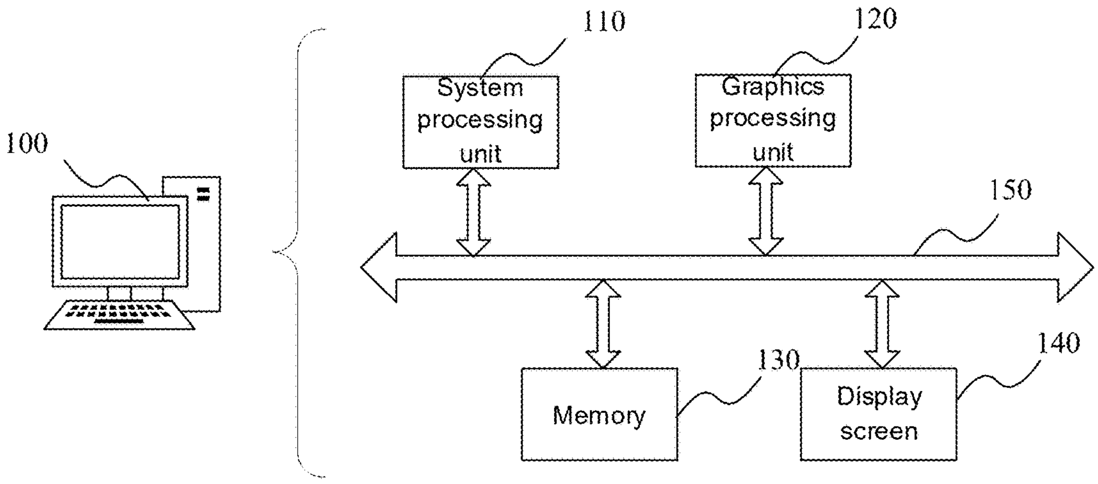
FIG. 1 shows a schematic structural diagram of an electronic device.

100 Electronic device
110 System processing unit
120 Graphics processing unit
121-1~121-*k* Graphics processing unit core
122 Configuration command processing unit
123 Crossbar bus
124-1~124-*k* L2 cache
130 Memory
140 Display screen
300 Graphics processing unit
310-1~310-M Data-and-command dispatcher
330-1~330-N Graphics processing unit core
500 Graphics processing unit
510-1~510-8 Data-and-command dispatcher
520-2~520-8 Data Selector
530-1~530-8 Graphics processing unit core

DETAILED DESCRIPTION

The embodiments of the present disclosure will be described below by specific examples. Those skilled in the art can easily understand other advantages and effects of the present disclosure according to contents disclosed by the specification. The present disclosure can also be implemented or applied through other different specific embodiments. Various details in this specification can also be modified or changed based on different viewpoints and disclosures without departing from the spirit of the present disclosure. It should be noted that the following embodiments and features of the following embodiments can be combined with each other if no conflict will result.

In the present disclosure, terms "mounted", "jointed", "connected", "fixed" and the like should be construed broadly unless otherwise expressly specified. For example, it can be a fixed connection, a detachable connection, or an integral whole; it can be a mechanical connection or an electrical connection; it can be a direct connection or an indirect connection by means of an intermediate medium; and it can also be a communication within two elements or an interaction between two elements. For those skilled in the art, the specific meanings of above terms in this disclosure may be understood according to specific conditions.

It should be noted that the drawings provided in this disclosure only illustrate the basic concept of the present disclosure in a schematic way, so the drawings only show the components closely related to the present disclosure. The drawings are not necessarily drawn according to the number, shape and size of the components in actual implementation; during the actual implementation, the type, quantity and proportion of each component can be changed as needed, and the layout of the components can also be more complicated.

The following embodiments of the present disclosure provide a graphics processing unit, application scenarios of which include, but are not limited to, electronic devices. The electronic device may be different types of electronic devices such as cell phones, tablets, personal computers (PCs), personal digital assistants (PDAs), smart watches, netbooks, wearable electronic devices, augmented reality (AR) devices, virtual reality (VR) devices, in-vehicle devices, smart vehicles, smart speakers, robots, smart glasses, and the like.

Please refer to FIG. 1, which shows a schematic structural diagram of an electronic device 100 according to an embodiment of the present disclosure. The electronic device 100 includes a system processing unit 110 (e.g., a CPU), a graphics processing unit 120, a memory 130, and a display screen 140.

In particular operations, the system processing unit 110 may activate an operation system (OS) to provide various operations of a user system, which includes user applications, data processing services, communication services, storage services, game services, or other operations. The graphics processing unit 120 may provide the system processing unit 110 with graphics processing, rendering services, enhancements, and the like. Specifically, referring to FIG. 2, the graphics processing unit 120 provides operations involving components including graphics processing unit cores (e.g., 121-1, 121-2, . . . , 121-*k*), a configuration command processing unit 122, a crossbar bus 123, etc., where k is a positive integer. It may be understood that operations such as graphics processing, rendering services, and enhancements may be completed by one or more functional modules of the core of the graphics processing unit 120, for example, one functional module of the core of the graphics processing unit 120 may correspondingly complete one operation. In FIG. 1, the graphics processing unit 120 may be a separate element connected to the system processing unit 110 through a communication line 150, however, in other embodiments, the graphics processing unit 120 may also be integrated into the system processing unit 110.

The memory 130 may include random access memory (RAM), cache memory devices, or other volatile memory elements employed by the system processing unit 110 or the graphics processing unit 120. Wherein, the other volatile memory elements employed by the graphics processing unit 120 include high-speed caches that may be integrated into the graphics processing unit 120, for example, level 2 (L2) caches 124-1, 124-2, . . . , 124-*k* in FIG. 2. The memory 130 may also include non-volatile memory elements, such as hard disk drives (HDDs), flash memory devices, solid state drives (SSDs), or other memory devices that store operating systems, applications, or other software or hardware for the electronic device 100.

Electronic devices 100 may communicate with each other via one or more communication links, such as one or more network links. For example, communication links may use metal, glass, optics, air, space, or some other material as a transmission medium. Examples of communication links may use various communication interfaces and protocols, such as Internet Protocol (IP), Ethernet, Universal Serial Bus (USB), Bluetooth, WiFi, or other communication signaling or communication formats, including combinations, improvements, or variants thereof. Communication links may be a direct link, or may include an intermediate network, a system, or a device, and may include a logical network link transmitted by multiple physical links.

The electronic device 100 may include software such as operating systems, logs, databases, utility programs, drivers, networking software, user applications, data processing applications, gaming applications, and other software stored on computer-readable media. The software of the electronic device 100 may include one or more platforms that are hosted by a distributed computing system or cloud computing service. The software of the electronic device 100 may include logical interface elements, such as software-defined interfaces and application programming interfaces (APIs).

The software of the electronic device 100 may be used to generate data to be rendered by the graphics processing unit 120, and to control the operation of the graphics processing unit 120 to render graphics, so as to output to one or more display screens 140 for display.

The system processing unit 110, the graphics processing unit 120, the memory 130, and the display screen 140 may communicate over the communication line 150 intercoupled. The communication line 150 may use metals, glass, optics, air, space, or some other material as a transmission media, exemplarily. The communication line 150 may use various communication protocols and communication signaling, such as a computer bus, including combinations or variants thereof. The communication line 150 may be a direct link, or may include an intermediate network, a system, or a device, and may include a logical network link transmitted by multiple physical links.

Figure 2:
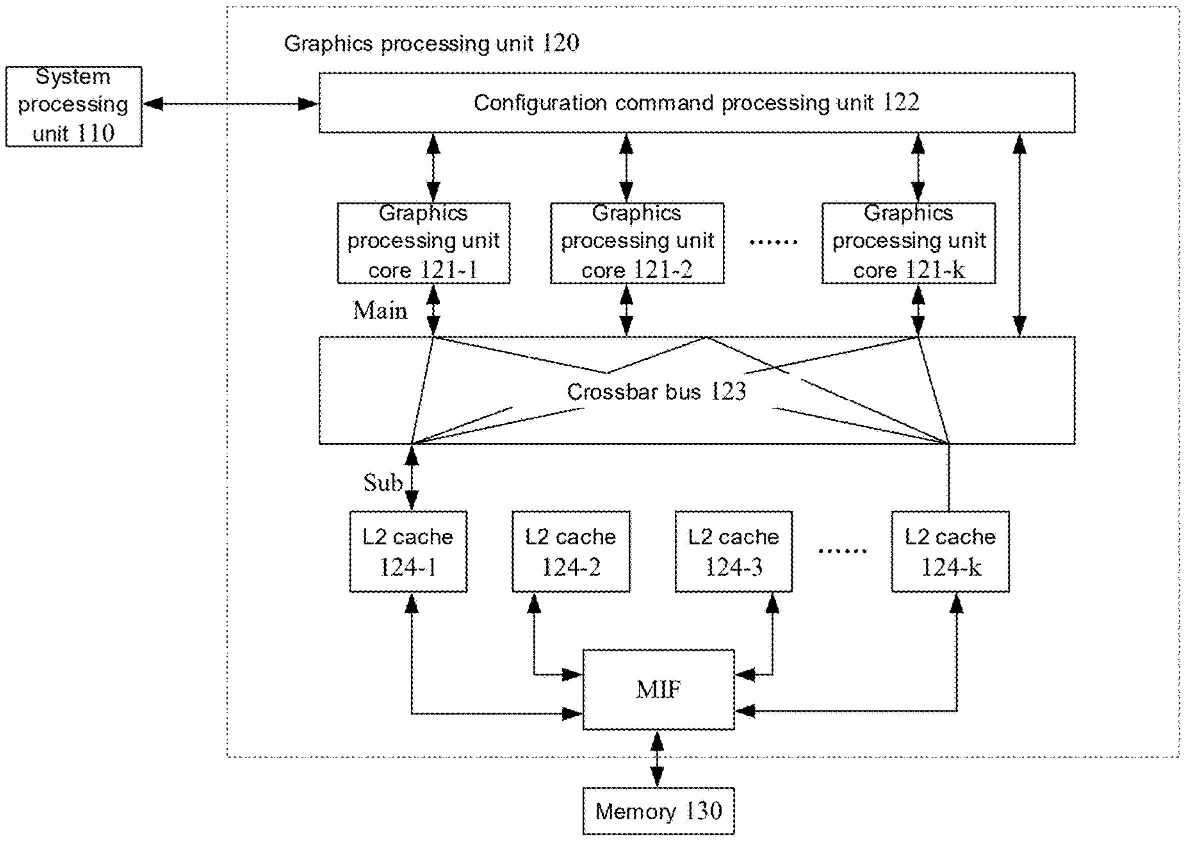
FIG. 2 shows a schematic structural diagram of a graphics processing unit.

FIG. 2 shows a graphics processing unit 120 according to an embodiment of the present disclosure. Specifically, as shown in FIG. 2, the graphics processing unit 120 includes a plurality of graphics processing unit cores 121-1, 121-2, . . . , 121-*k*, a configuration command processing unit 122, a crossbar bus 123, and a plurality of L2 caches 124-1, 124-2, 124-3, . . . , 124-*k*. Wherein, the crossbar bus 123 is connected between the graphics processing unit cores and the L2 caches so as to provide a channel, through which the graphics processing unit cores access the L2 caches and the L2 caches return data to the graphics processing unit cores. In addition, the L2 caches are further connected to the memory 130 set externally through a memory interface (MIF).

According to the embodiment of the present disclosure, the system processing unit 110 prepares tasks and data to be run by the graphics processing unit 120, and the tasks and data are sent to the graphics processing unit cores in a command configuration manner. Specifically, the configuration command processing unit 122 receives a command issued by the system processing unit 110, parses tasks, and directly issues the tasks to the graphics processing unit cores, and the graphics processing unit cores start to execute the tasks. The configuration command processing unit 122 may also send the tasks to the memory 130 through the crossbar bus 123, and the graphics processing unit cores read and process the tasks from the memory 130.

Specifically, the process of executing tasks by the graphics processing unit cores includes: reading task-related external data from the memory 130, processing the data and writing out data. Since the graphics processing unit cores operate with multiple threads, that is, the graphics processing unit cores process a batch of data according to one instruction, the L2 caches are typically placed between the graphics processing unit cores and the memory 130 to reduce the delay of the graphics processing unit cores in fetching and storing data and to improve the processing efficiency of the graphics processing unit cores. By the L2 caches, a large amount of data is pre-fetched and cached, and the waiting time of the graphics processing unit cores is reduced.

The technical solutions in the embodiment of the present disclosure will be described in detail below with reference to the accompanying drawings.

Figure 3A:
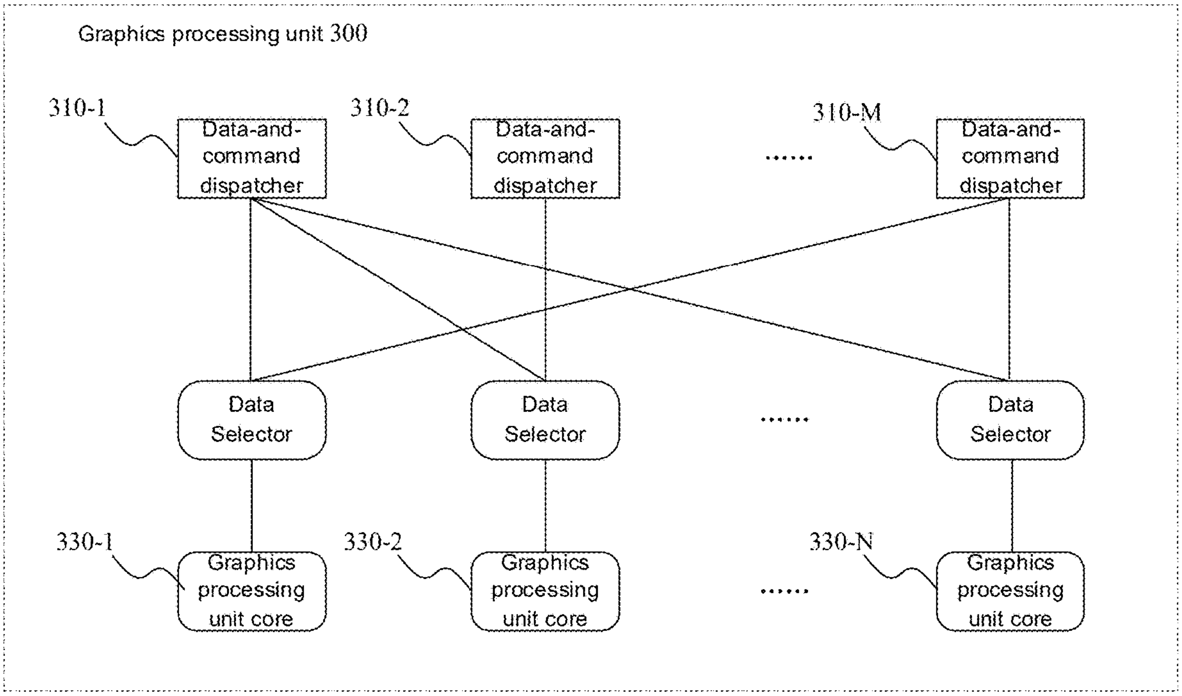
FIG. 3A shows a schematic structural diagram of a graphics processing unit according to an embodiment of the present disclosure.

FIG. 3A shows a schematic structural diagram of a graphics processing unit 300 according to an embodiment of the present disclosure. As shown in FIG. 3A, the graphics processing unit 300 includes M data-and-command dispatchers 310-1 to 310-M and N graphics processing unit cores (cluster) 330-1 to 330-N, where M and N are both positive integers greater than or equal to 2, and each graphics processing unit core includes a set of graphics processing lines. In some embodiments, M and N may be the same, and in other embodiments, M and N may also be different. Each data-and-command dispatcher may be connected to at least one graphics processing unit core, and at most N graphics processing unit cores. The connection between the data-and-command dispatchers and the graphics processing unit cores includes, but is not limited to, a direct connection or an indirect connection by means of a data selector. One data-and-command dispatcher is connected to one graphics processing unit core through a set of data-and-command transmission lines, each set of data-and-command transmission lines may include, for example, 1000-2000 lines.

In the embodiment of the present disclosure, the graphics processing unit 300 is configured to provide at least one virtual graphics processing unit, and each virtual graphics processing unit includes one data-and-command dispatcher and some or all graphics processing unit cores connected to the data-and-command dispatcher. For example, in the graphics processing unit 300 shown in FIG. 3A, the data-and-command dispatcher 310-1 and graphics processing unit cores 330-1 and 330-N connected thereto may provide a virtual graphics processing unit, the data-and-command dispatcher 310-2 and the graphics processing unit core 330-2 connected thereto may provide another virtual graphics processing unit.

In some embodiments, the graphics processing unit may provide a plurality of virtual graphics processing units at the same time, each virtual graphics processing unit may include a plurality of graphics processing unit cores, and each graphics processing unit core is only contained in one virtual graphics processing unit. Each user may use one virtual graphics processing unit, and each graphics processing unit core can only be used by one user at the same time.

Figure 3B:
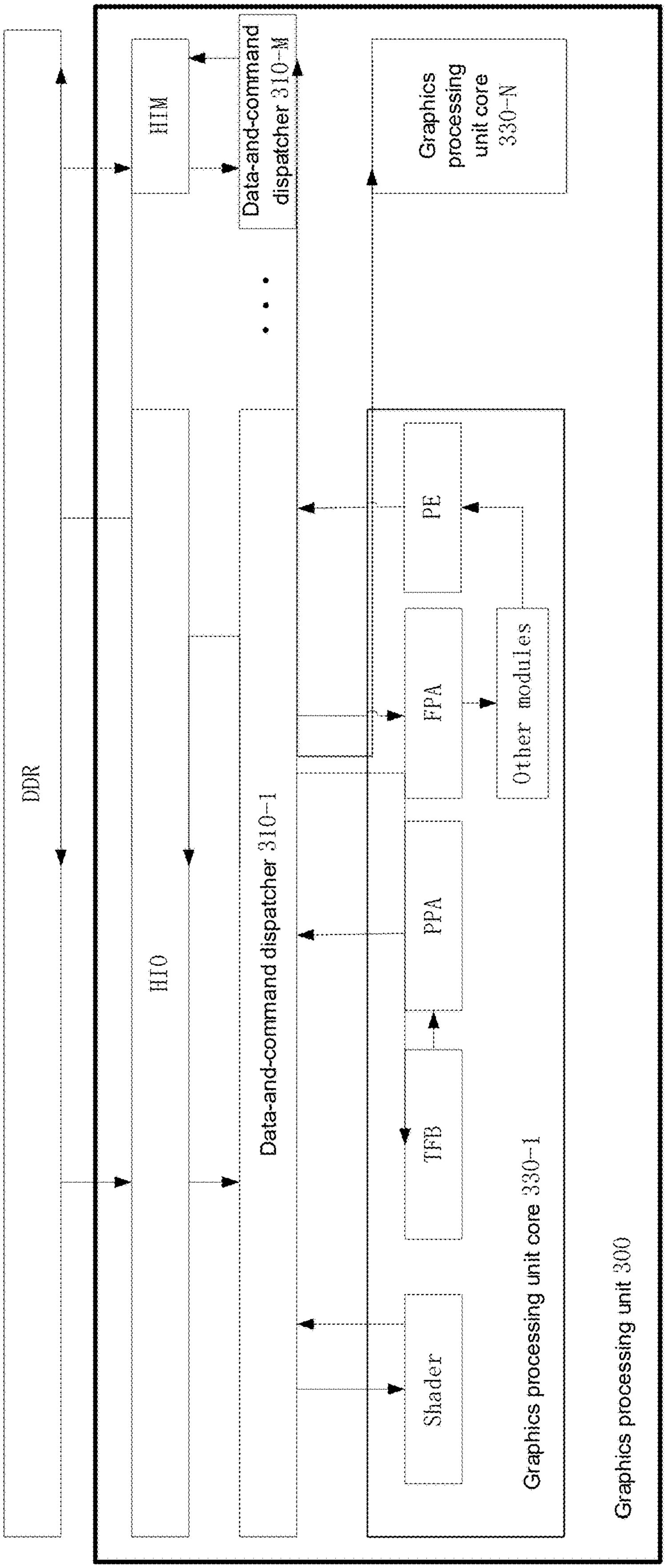
FIG. 3B shows a schematic diagram of a connection method between a data-and-command dispatcher and a graphics processing unit core according to an embodiment of the present disclosure.

Optionally, FIG. 3B shows a schematic diagram of a connection between data-and-command dispatchers and graphics processing unit cores according to an embodiment of the present disclosure. By taking the data-and-command dispatcher 310-1 as an example, it is connected to a double data rate (DDR) through a Host Interface (HI) 0 of an advanced extensible interface (AXI) and an advanced high-performance bus (AHB). Wherein, the advanced extensible interface is a bus protocol that corresponds to an in-chip bus facing high-performance, high bandwidth, and low delay. The advanced extensible interface can enable a System on Chip (SoC) to obtain more excellent performance with a smaller area and lower power consumption. The advanced high-performance bus is a high-performance bus, and is mainly used for connections between high-performance modules, wherein the main features of the advanced high-performance bus include a single clock edge operation, a non-three-state implementation, support burst transmission, and the like. The graphics processing unit core 330-1 includes a shader module, a transform feedback (TFB) module, a position primitive assembly (PPA) module, a final primitive assembly (FPA) module, a pixel engine (PE) module, and other modules. Wherein, the final primitive assembly module is configured to write out an intermediate result to the memory. The position primitive assembly module is configured to perform back face culling, zero area culling, and other culling operations. The FPA module is configured to perform viewport frustum transformation, and the pixel engine module is configured to perform operations such as an alpha blending on pixels.

According to the above description, the graphics processing unit provided in the embodiment of the present disclosure can provide at least one virtual graphics processing unit to the user, and the graphics processing unit can be shared by multiple users in a manner of virtualization of the graphics processing unit.

According to an embodiment of the present disclosure, the graphics processing unit is configured to provide n virtual graphics processing units according to received instructions, where n is any positive integer less than or equal to N, and N is the number of graphics processing unit cores, the value of which may be, for example, 4, 8, 16, etc. Optionally, the n virtual graphics processing units include all of N graphics processing unit cores, but the present disclosure is not limited thereto.

Figure 4:
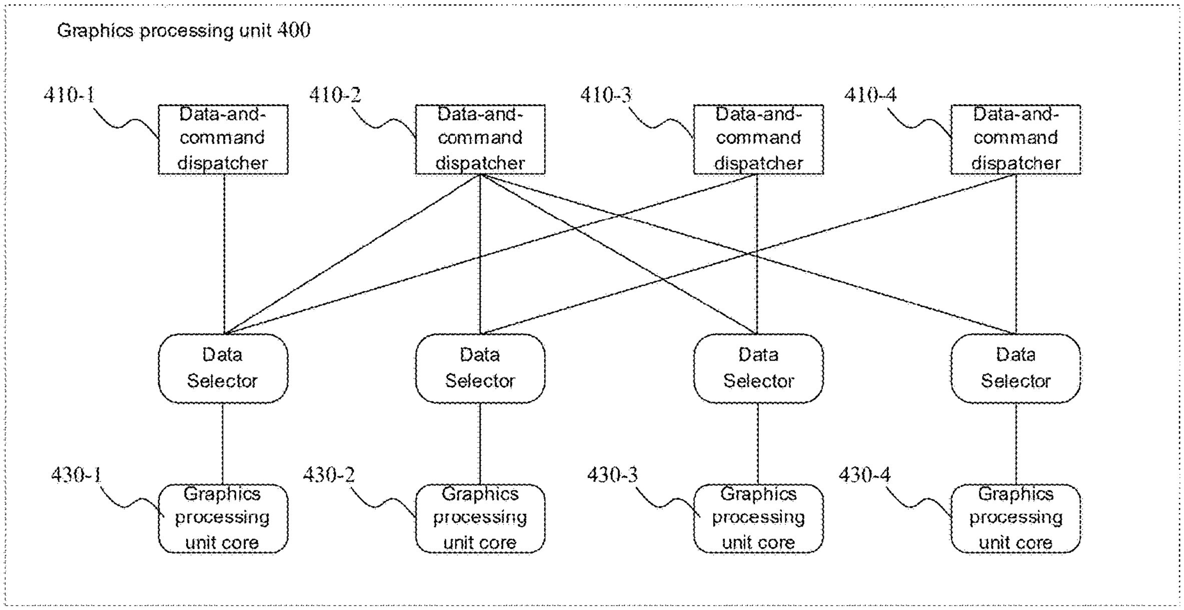
FIG. 4 shows a schematic structural diagram of a graphics processing unit according to an embodiment of the present disclosure.

In an embodiment of the present disclosure, the i-th data-and-command dispatcher of the graphics processing unit is connected to floor $(N/n_i)$ graphics processing unit cores, where i and $n_i$ are both positive integers less than or equal to N, and floor is a downward rounding function. Referring to FIG. 4, taking N=4 as an example, the 1st data-and-command dispatcher 410-1 of the graphics processing unit 400 is connected with one graphics processing unit core 430-1 ($n_1=3$), the 2nd data-and-command dispatcher 410-2 is connected with four graphics processing unit cores 430-1 to 430-4 ($n_2=1$), the 3rd data-and-command dispatcher 410-3 is connected with two graphics processing unit cores 430-1 and 430-3 ($n_3=2$), and the 4th data-and-command dispatcher 410-4 is connected with two graphics processing unit cores 430-2 and 430-4 ($n_4=2$). In the embodiment of the present disclosure, the connection between data-and-command dispatchers and graphics processing unit cores includes, but is not limited to, a direct connection or an indirect connection by means of a data selector.

The graphics processing unit 400 shown in FIG. 4 may be configured to provide 1 to 4 virtual graphics processing units according to the received instruction. When the graphics processing unit is configured to provide one virtual graphics processing unit, the user may use four graphics processing unit cores 430-1 to 430-4 through the data-and-command dispatcher 410-2. When the graphics processing unit is configured to provide two virtual graphics processing units, one user may use graphics processing unit cores 430-1 and 430-3 through the data-and-command dispatcher 410-2, and the other user may use graphics processing unit cores 430-2 and 430-4 through the data-and-command dispatcher 410-4. When the graphics processing unit is configured to provide three virtual graphics processing units, the 1st user may use the graphics processing unit core 430-1 through the data-and-command dispatcher 410-1, and the 2nd user may use graphics processing unit cores 430-2 and 430-4 through the data-and-command dispatcher 410-2, and the 3rd user may use the graphics processing unit core 430-3 through the data-and-command dispatcher 410-3. When the graphics processing unit is configured to provide four virtual graphics processing units, the 1st user may use the graphics processing unit core 430-1 through the data-and-command dispatcher 410-1, and the 2nd user may use the graphics processing unit core 430-2 through the data-and-command dispatcher 410-2, the 3rd user may use the graphics processing unit core 430-3 through the data-and-command dispatcher 410-3, and the 4th user may use the graphics processing unit core 430-4 through the data-and-command dispatcher 410-4.

According to the above description, in the embodiment of the present disclosure, the connection between the data-and-command dispatchers and the graphics processing unit cores is simplified into 1 one-to-four connection (1*4 sets of connection lines), 2 one-to-two connections (2*2 sets of connection lines), and 1 one-to-one connection (1*1 set of connection lines), resulting in a total of 9 sets of connection lines between the data-and-command dispatchers and the graphics processing unit cores. Compared with the manner in which data-and-command dispatchers are fully connected to graphics processing unit cores, connection lines required by the present disclosure are less, which is conducive to avoiding the congestion problem in the P&R stage and reducing the chip area.

It should be understood that the connection between the data-and-command dispatchers and the graphics processing unit cores when N equals 4, as shown in FIG. 4, is merely a possible way for the embodiment of the present disclosure, and the present disclosure is not limited thereto. In some embodiments, the graphics processing unit cores connected to the data and command dispensers may differ from that in FIG. 4, for example, the data-and-command dispatcher 410-1 may be connected to 430-2 instead of 430-1, and the data-and-command dispatcher 410-3 may be connected to 430-2 and 430-4 instead of 430-1 and 430-3. In other embodiments, the number of graphics processing unit cores connected to the data and command dispensers may differ from that in FIG. 4, for example, the number of graphics processing unit cores connected to the data-and-command dispatcher 410-1 may be 2, 3, or 4, and the number of graphics processing unit cores connected to the data-and-command dispatcher 410-2 may be 1, 2, or 3.

It should be noted that, in order to improve the utilization efficiency of cores, all virtual graphics processing units provided by the graphics processing unit at the same time use all of four graphics processing unit cores, but the present disclosure is not limited thereto. For example, when the graphics processing unit 400 is configured to provide one virtual graphics processing unit, the user may use two graphics processing unit cores 430-1 and 430-3 through the data-and-command dispatcher 410-2, with the other two graphics processing unit cores 430-2 and 430-4 being in an idle state. For example, when the graphics processing unit 400 is configured to provide two virtual graphics processing units, one user may use the graphics processing unit core 430-1 through the data-and-command dispatcher 410-1, the other user may use graphics processing unit cores 430-2 and 430-4 through the data-and-command dispatcher 410-4, with the graphics processing unit core 430-3 in an idle state.

In an embodiment of the present disclosure, the graphics processing unit includes N data-and-command dispatchers, one of which is connected to N graphics processing unit cores, $m_j$-$m_{j+1}$ of which are connected to N/$m_j$ graphics processing unit cores, where $m_j$ and $m_{j+1}$ are adjacent positive integers capable of being divided by N, and $1 \le m_{j+}$ $1 \leq m_j \leq N$. For example, when N equals 4, values of $m_j$ and $m_{j+1}$ include two: $m_{j+1}=1$ and $m_j=2$, $m_{j+1}=2$ and $m_j=4$. Based on this, when the graphics processing unit provided in the embodiment of the present disclosure includes four data-and-command dispatchers, one of which is connected to four graphics processing unit cores, another one is connected to two graphics processing unit cores ($m_{j+1}=1$ and $m_j=2$), and the remaining two data-and-command dispatchers are respectively connected to a graphics processing unit core ($m_{j+1}=2$ and $m_j=4$). In the embodiment of the present disclosure, the connection between the data-and-command dispatchers and the graphics processing unit cores includes, but is not limited to, a direct connection or an indirect connection by means of a data selector.

Figure 5A:
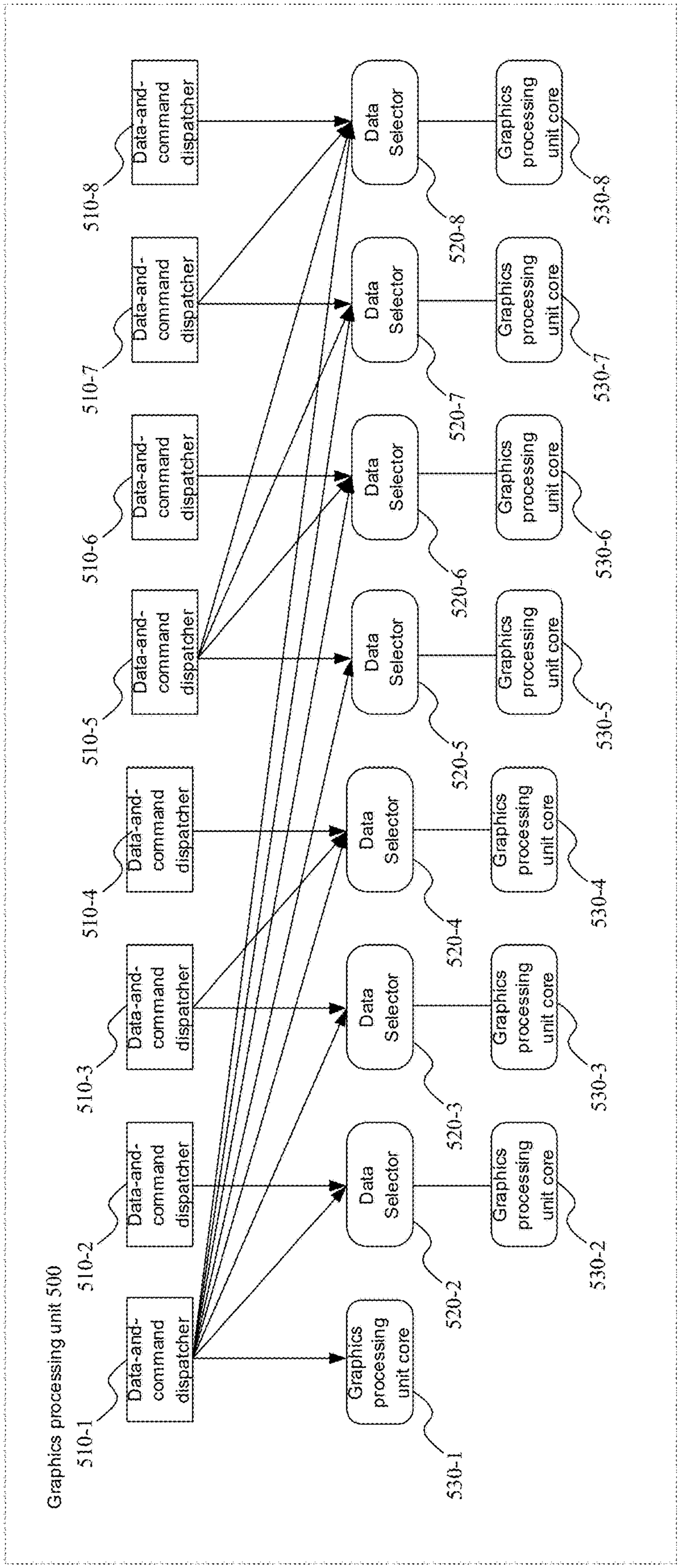
FIGS. 5A and 5B show schematic structural diagrams of a graphics processing unit according to an embodiment of the present disclosure.

Next, the above connection will be described in detail by respectively taking N equals 8 or 16 as an example. Referring to FIG. 5A, when N equals 8, the graphics processing unit 500 includes 8 data-and-command dispatchers. A data-and-command dispatcher 510-1 is directly connected to a graphics processing unit core 530-1 and is indirectly connected to graphics processing unit cores 530-2 to 530-8 through data selectors. A data-and-command dispatcher 510-5 is indirectly connected to four graphics processing unit cores 530-5 to 530-8 through data selectors ($m_{j+1}=1$ and $m_j=2$). For data-and-command dispatchers 510-3 and 510-7, the data-and-command dispatcher 510-3 is indirectly connected to two graphics processing unit cores 530-3 to 530-4 through data selectors, and the data-and-command dispatcher 510-7 is indirectly connected to two graphics processing unit cores 530-7 to 530-8 through data selectors ($m_{j+1}=2$ and $m_j=4$). Four data-and-command dispatchers 510-2, 510-4, 510-6 and 510-8 are indirectly connected to their respective corresponding graphics processing unit cores 530-2, 530-4, 530-6 and 530-8 through data selectors ($m_{j+1}=4$ and $m_j=8$).

The graphics processing unit 500 shown in FIG. 5A may be configured to provide 1 to 8 virtual graphics processing units that are capable of supporting at least one user (when the graphics processing unit 500 is configured to provide 1 virtual graphics processing unit) and capable of supporting at most eight users (when the graphics processing unit 500 is configured to provide 8 virtual graphics processing units). graphics processing unit cores of the graphics processing unit 500 have 22 possible allocations, as shown in Table 1 below. For example, the graphics processing unit 500 in the 10th case is configured to provide 3 virtual graphics processing units to 3 users, where two users respectively occupy 3 graphics processing unit cores, and the other one occupies 2 graphics processing unit cores. With reference to FIG. 5A, the allocation of graphics processing unit cores may be that the 1st user occupies graphics processing unit cores 530-1, 530-2 and 530-8, the 2nd user occupies graphics processing unit cores 530-5, 530-6 and 530-7, and the 3rd user occupies graphics processing unit cores 530-3 and 530-4.

Figure 5B:
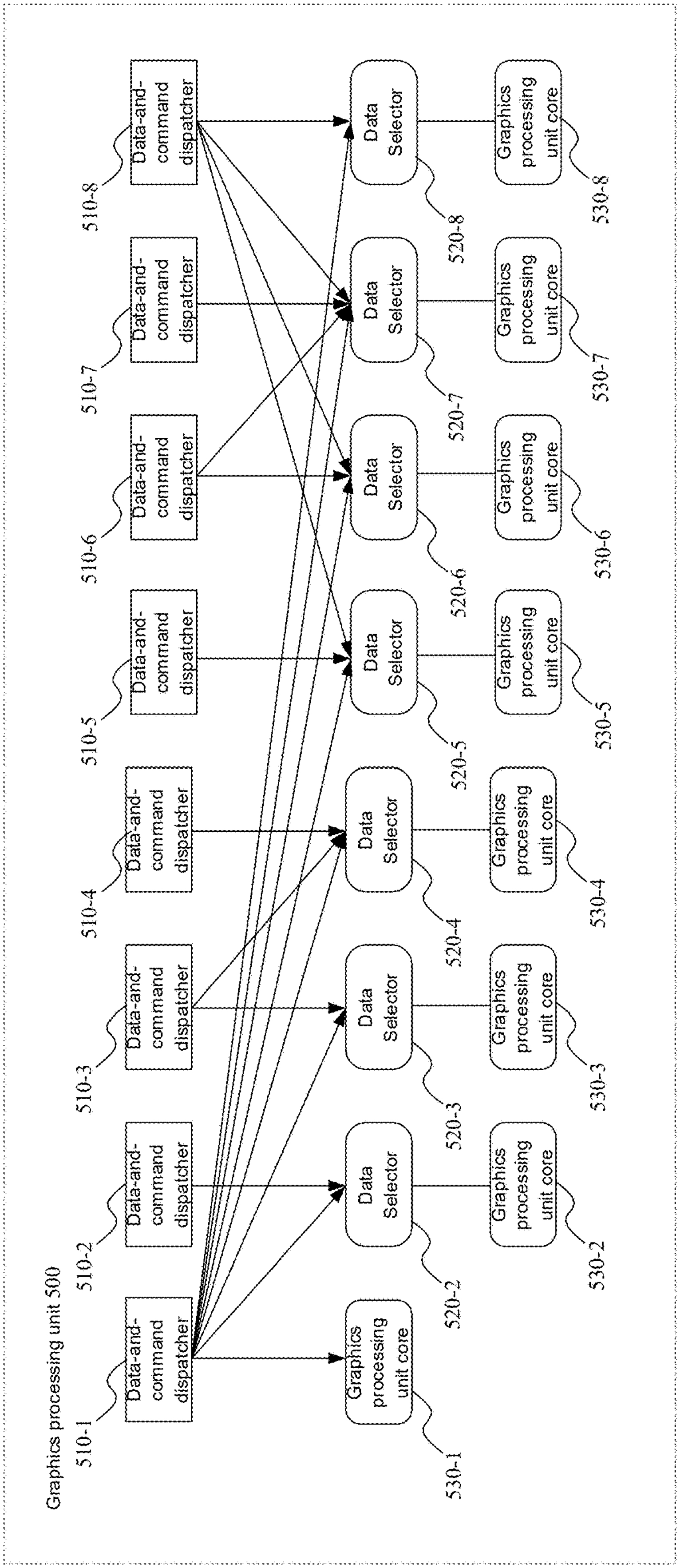

It should be noted that the connection method between the data-and-command dispatchers and the graphics processing unit cores in the embodiment of the present disclosure is not unique, and other connection methods may also be applied in some other embodiments. For example, FIG. 5B shows another connection method when N equals 8, and this connection method has the same effect as that in FIG. 5A.

TABLE 1

Allocation of the number of cores for graphics processing unit 500

| Number | Number of Users | Allocation of the number of cores for graphics processing unit |
|---|---|---|
| 1 | 1 | 8 |
| 2 | 2 | 7:1 |
| 3 | | 6:2 |
| 4 | | 5:3 |
| 5 | | 4:4 |
| 6 | 3 | 6:1:1 |
| 7 | | 5:2:1 |
| 8 | | 4:3:1 |
| 9 | | 4:2:2 |
| 10 | | 3:3:2 |
| 11 | 4 | 5:1:1:1 |
| 12 | | 4:2:1:1 |
| 13 | | 3:3:1:1 |
| 14 | | 3:2:2:1 |
| 15 | | 2:2:2:2 |
| 16 | 5 | 4:1:1:1:1 |
| 17 | | 3:2:1:1:1 |
| 18 | | 2:2:2:1:1 |
| 19 | 6 | 3:1:1:1:1:1 |
| 20 | | 2:2:1:1:1:1 |
| 21 | 7 | 2:1:1:1:1:1:1 |
| 22 | 8 | 1:1:1:1:1:1:1:1 |

According to the above description, the connection between the data-and-command dispatchers and the graphics processing unit cores is simplified into 1 one-to-eight connection (1*8 sets of connection lines), 1 one-to-four connection (1*4 sets of connection lines), 2 one-to-two connections (2*2 sets of connection lines), and four one-to-one connections (4*1 sets of connection lines), resulting in a total of 20 sets of connection lines between the data-and-command dispatchers and the graphics processing unit cores. Wherein, each set of connection lines may include, for example, 1000-2000 lines. Compared with the manner in which data-and-command dispatchers are fully connected to graphics processing unit cores, connection lines required by the present disclosure are less, which is conducive to avoiding the congestion problem in the P&R stage and reducing the chip area.

Figure 5C:
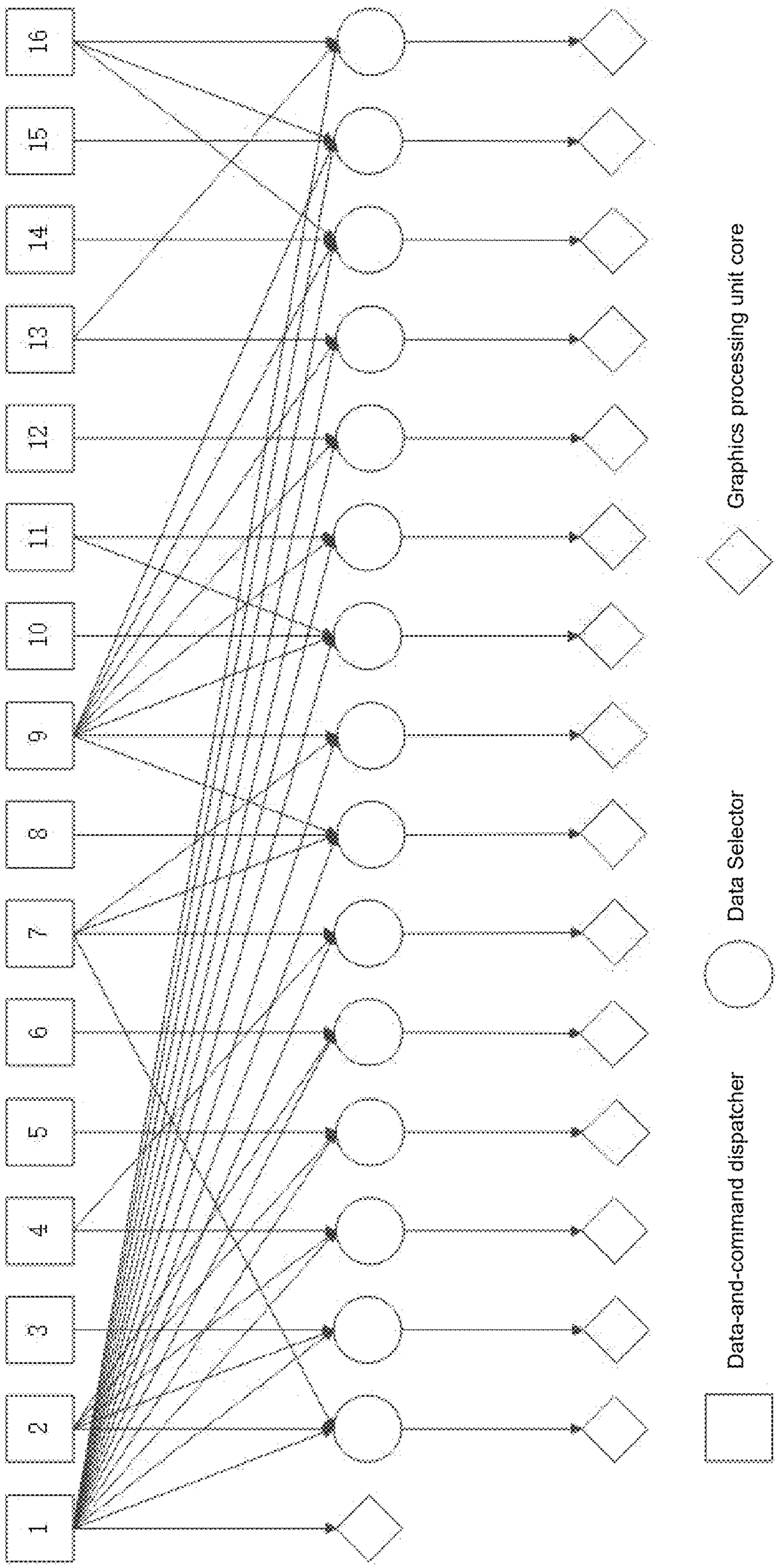
FIG. 5C shows a schematic structural diagram of a graphics processing unit according to an embodiment of the present disclosure.

Referring to FIG. 5C, in another embodiment, the graphics processing unit includes 16 data-and-command dispatchers. The 1st data-and-command dispatcher is directly connected to the 1st graphics processing unit core and is indirectly connected to other 15 graphics processing unit cores through data selectors. The 9th data-and-command dispatcher is indirectly connected to 8 graphics processing unit cores through data selectors. The 2nd data-and-command dispatcher is indirectly connected to 5 graphics processing unit cores through data selectors. The 7th data-and-command dispatcher is indirectly connected to 4 graphics processing unit cores through data selectors. The 16th data-and-command dispatcher is indirectly connected to 3 graphics processing unit cores through data selectors. The 4th, 11th and 13th data-and-command dispatchers are respectively indirectly connected to 2 graphics processing unit cores through data selectors. The 3rd, 5th, 6th, 8th, 10th, 12th, 14th and 15th data-and-command dispatchers are respectively indirectly connected to a graphics processing unit core through a data selector. In the embodiment, the connection between the data-and-command dispatchers and the graphics processing unit cores is simplified into 1 one-to-sixteen connection (1*16 sets of connection lines), 1 one-to-eight connection (1*8 sets of connection lines), 1 one-to-five connection (1*5 sets of connection lines), 1 one-to-four connection (1*4 sets of connection lines), 1 one-to-three connection (1*3 sets of connection lines), 3 one-to-two connections (3*2 sets of connection lines), and eight one-to-one connections (8*1 sets of connection lines), resulting in a total of 50 sets of connection lines between the data-and-command dispatchers and the graphics processing unit cores. Compared with the manner in which data-and-command dispatchers are fully connected to graphics processing unit cores, connection lines required by the present disclosure are less, which is conducive to avoiding the congestion problem in the P&R stage and reducing the chip area.

In an embodiment of the present disclosure, the graphics processing unit may further include data selectors. A graphics processing unit core connecting with at least two data-and-command dispatchers is indirectly connected to the data-and-command dispatchers through the data selectors. For example, the graphics processing unit 500, shown in FIG. 5A includes data selectors 520-2 to 520-8. A graphics processing unit core connecting with at least two data-and-command dispatchers, such as graphics processing unit core 530-5, is indirectly connected to the corresponding data-and-command dispatchers through data selectors. In the embodiment of the present disclosure, the data selector selects at most one data-and-command dispatcher to be connected to the graphics processing unit core at the same time.

Optionally, graphics processing unit cores that are connected to only one data-and-command dispatcher, such as graphics processing unit core 530-1, may be connected to the data-and-command dispatcher without a data selector.

Figure 6:
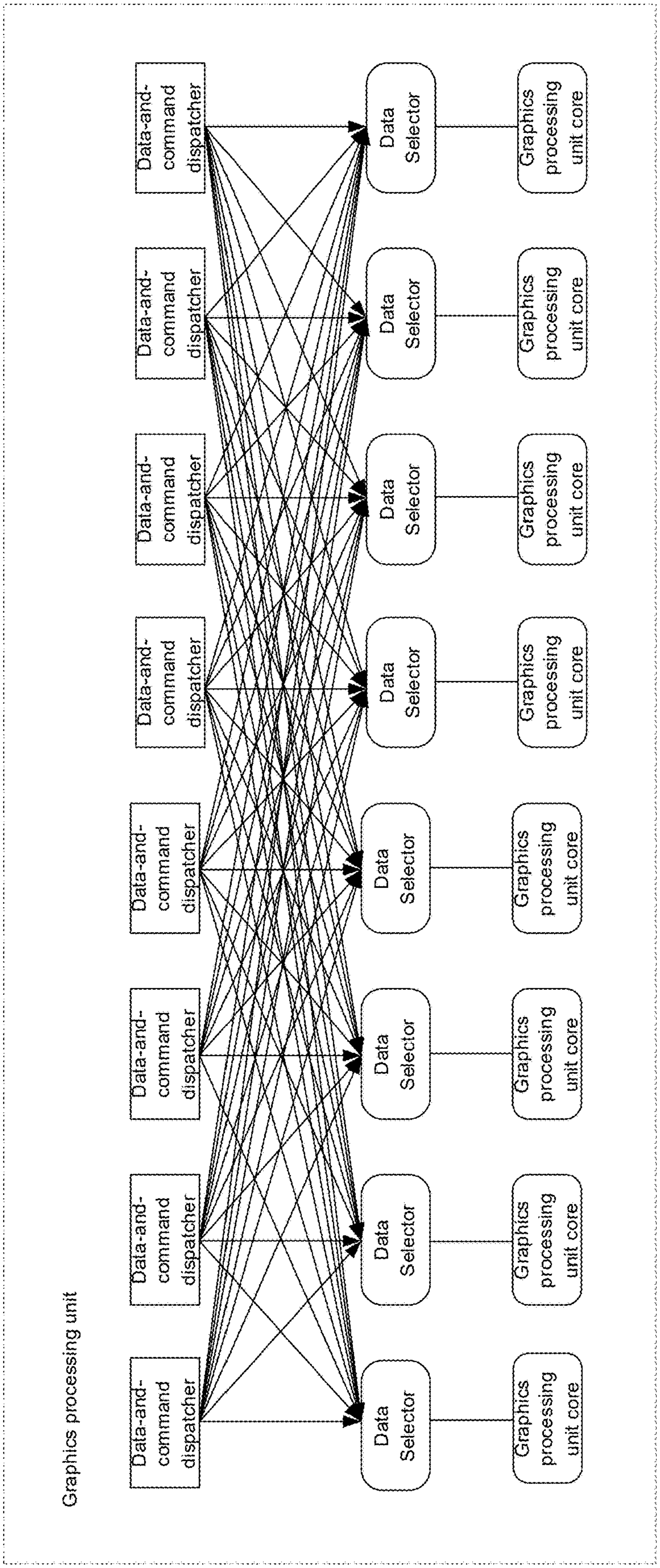
FIG. 6 shows a schematic structural diagram of a graphics processing unit according to an embodiment of the present disclosure.

It should be understood that the data selector described in the embodiment of the present disclosure includes all devices or circuits capable of selecting and outputting a specified signal from a set of input signals, but is not limited to a certain particular device or circuit. In an embodiment of the present disclosure, the data-and-command dispatchers are fully connected to the graphics processing unit cores. Fully connected indicates that each data-and-command dispatcher is connected to all graphics processing unit cores, and each graphics processing unit core is connected to all data-and-command dispatchers. The connection between the data-and-command dispatchers and the graphics processing unit cores includes, but is not limited to, a direct connection or an indirect connection by means of a data selector. FIG. 6 shows an example diagram of a full connection between data-and-command dispatchers and graphics processing unit cores when N equals 8. At this time, the graphics processing unit may be configured to provide 1 to 8 virtual graphics processing units and can satisfy all allocations of graphics processing unit cores.

In an embodiment of the present disclosure, the number of physical layers of the graphics processing unit is configured according to the number of data-and-command transmission lines. Specifically, each physical layer of the graphics processing unit has a maximum limit on the number of data-and-command transmission lines it can contain. The fewer the number of data-and-command transmission lines, the fewer the number of physical layers of the graphics processing unit. Taking N equals 8 as an example, when data-and-command dispatchers are fully connected to graphics processing unit cores, the number of data-and-command transmission lines is 64, and the number of physical layers of the graphics processing unit is configured as 8. When the connection shown in FIG. 5A or FIG. 5B is applied, the number of data-and-command transmission lines is 20, and the number of physical layers of the graphics processing unit can be configured as 4. At this time, the number of physical layers of the graphics processing unit can be reduced.

Figure 7:
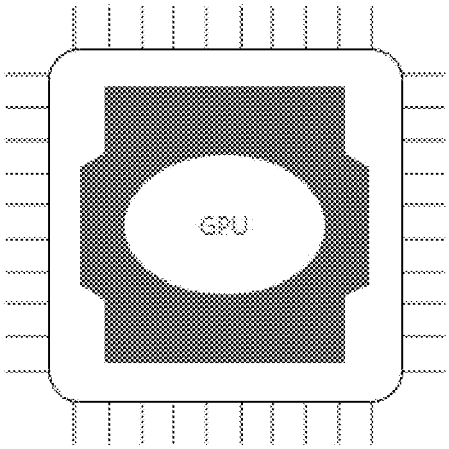
FIG. 7 shows a schematic structural diagram of a chip according to an embodiment of the present disclosure.

The present disclosure further provides a chip. FIG. 7 shows a schematic structural diagram of a chip according to an embodiment of the present disclosure, wherein the chip includes the graphics processing unit according to any one of embodiments of the present disclosure and input/output pins.

The present disclosure further provides an electronic device, the electronic device includes the graphics processing unit according to any one of embodiments of the present disclosure and a memory communicatively connected to the graphics processing unit.

In summary, the graphics processing unit provided in the embodiment of the present disclosure can provide at least one virtual graphics processing unit, and the graphics processing unit can be shared by multiple users in a manner of virtualization of the graphics processing unit. In some embodiments of the present disclosure, by optimizing the connection between data-and-command dispatchers and graphics processing unit cores, it is possible to reduce the number of connection lines between data-and-command dispatchers and graphics processing unit cores, avoiding the congestion problem of chips in the P&R stage, and facilitating the reduction of the chip area and the number of physical layers of the graphics processing unit. Therefore, the present disclosure effectively overcomes various shortcomings of the prior art and has a high industrial value.

The above-mentioned embodiments only exemplarily illustrate the principles and effects of the present disclosure, but are not used to limit the present disclosure. Any person skilled in the art may modify or change the above embodiments without violating the spirit and scope of the present disclosure. Therefore, all equivalent modifications or changes made by those skilled in the art without departing from the spirit and technical concepts disclosed by the present disclosure should still be covered by the attached claims of the present disclosure.

What is claimed is:

1. A graphics processing unit, comprising data-and-command dispatchers and N graphics processing unit cores, wherein each one of the data-and-command dispatchers is connected to a configured number of the graphics processing unit cores through data-and-command transmission lines, wherein configured numbers of the graphics processing unit cores corresponding to the data-and-command dispatchers are determined as follows:

one of the data-and-command dispatchers is connected to N graphics processing unit cores, and $m_j-m_{j+1}$ of the data-and-command dispatchers are connected to $N/m_j$ graphics processing unit cores, wherein $m_j$ and $m_{j+1}$ are adjacent positive integers capable of being divided by N, and $1 \le m_{j+1} \le m_j \le N$;

wherein at the same time, the graphics processing unit is configured to provide n virtual graphics processing units according to a received instruction, and each one of the n virtual graphics processing units includes one data-and-command dispatcher and some or all of the configured number of the graphics processing unit cores connected to said data-and-command dispatcher, wherein n is any positive integer less than or equal to N;

wherein the graphics processing unit includes N data-and-command dispatchers;

wherein taking N as eight, the configured numbers of the graphics processing unit cores corresponding to the N data-and-command dispatchers are determined as follows:

one of the data-and-command dispatchers is connected to eight graphics processing unit cores, providing one one-to-eight connection;

one of the data-and-command dispatchers are connected to four graphics processing unit cores, providing one one-to-four connection in response to a situation where mi equals two and $m_{j+1}$ equals one;

two of the data-and-command dispatchers are connected to two graphics processing unit cores, providing two one-to-two connections in response to a situation where mi equals four and mi equals two; and four of the data-and-command dispatchers are connected to one graphics processing unit cores, providing four one-to-one connections in response to a situation where mi equals eight and $m_{j+1}$ equals four.

2. The graphics processing unit according to claim 1, wherein the graphics processing unit further includes at least one data selector, and one of the graphics processing unit cores connecting with at least two data-and-command dispatchers is connected to the data-and-command dispatchers through the data selector.

3. The graphics processing unit according to claim 1, wherein the number of physical layers of the graphics processing unit is configured according to the number of the data-and-command transmission lines.

4. The graphics processing unit according to claim 1, wherein the data-and-command dispatchers are fully connected to the graphics processing unit cores.

5. The graphics processing unit according to claim 1, wherein each one of the N graphics processing unit cores includes a set of graphics processing lines.

6. The graphics processing unit according to claim 1, wherein each one of the N graphics processing unit cores is only contained in one of the n virtual graphics processing units at the same time.

7. The graphics processing unit according to claim 1, wherein each one of the N graphics processing unit cores comprises one or more selected from the group consisting of a shader module, a transform feedback module, a position primitive assembly module, a final primitive assembly module, a pixel engine module, and other modules.

8. The graphics processing unit according to claim 1, wherein each one of the data selectors selects at most one data-and-command dispatcher to be connected to one or more graphics processing unit cores at the same time.

9. A chip, comprising a graphics processing unit and input/output pins, wherein the graphics processing unit comprises data-and-command dispatchers and N graphics processing unit cores, wherein each one of the data-and-command dispatchers is connected to a configured number of the graphics processing unit cores through data-and-command transmission lines, wherein configured numbers of the graphics processing unit cores corresponding to the data-and-command dispatchers are determined as follows:

one of the data-and-command dispatchers is connected to N graphics processing unit cores, and $m_j-m_{j+1}$ of the data-and-command dispatchers are connected to $N/m_j$ graphics processing unit cores, wherein $m_j$ and $m_{j+1}$ are adjacent positive integers capable of being divided by N, and $1 \leq m_{j+1} \leq MSN$;

wherein at the same time, the graphics processing unit is configured to provide n virtual graphics processing units according to a received instruction, and each one of the n virtual graphics processing units include one data-and-command dispatcher and some or all of the configured number of the graphics processing unit cores connected to said data-and-command dispatcher, wherein n is any positive integer less than or equal to N;

wherein the graphics processing unit includes N data-and-command dispatchers;

wherein taking N as eight, the configured numbers of the graphics processing unit cores corresponding to the N data-and-command dispatchers are determined as follows:

one of the data-and-command dispatchers is connected to eight graphics processing unit cores, providing one one-to-eight connection;

one of the data-and-command dispatchers are connected to four graphics processing unit cores, providing one one-to-four connection in response to a situation where mi equals two and $m_{j+1}$ equals one;

two of the data-and-command dispatchers are connected to two graphics processing unit cores, providing two one-to-two connections in response to a situation where mi equals four and $m_{j+1}$ equals two; and four of the data-and-command dispatchers are connected to one graphics processing unit cores, providing four one-to-one connections in response to a situation where $m_j$ equals eight and $m_{j+1}$ equals four.

10. The chip according to claim 9, wherein the graphics processing unit further includes at least one data selector, and one of the graphics processing unit cores connecting with at least two data-and-command dispatchers is connected to the data-and-command dispatchers through the data selector.

11. The chip according to claim 9, wherein the number of physical layers of the graphics processing unit is configured according to the number of the data-and-command transmission lines.

12. An electronic device, comprising a graphics processing unit and a memory communicatively connected to the graphics processing unit, wherein the graphics processing unit comprises data-and-command dispatchers and N graphics processing unit cores, wherein each one of the data-and-command dispatchers is connected to a configured number of the graphics processing unit cores through data-and-command transmission lines, wherein configured numbers of the graphics processing unit cores corresponding to the data-and-command dispatchers are determined as follows:

one of the data-and-command dispatchers is connected to N graphics processing unit cores, and $m_j-m_{j+1}$ of the data-and-command dispatchers are connected to $N/m_j$ graphics processing unit cores, wherein $m_j$ and $m_{j+1}$ are adjacent positive integers capable of being divided by N, and $1 \leq m_{j+1} < m_j \leq N$;

wherein at the same time, the graphics processing unit is configured to provide n virtual graphics processing units according to a received instruction, and each one of the n virtual graphics processing units include one data-and-command dispatcher and some or all of the configured number of the graphics processing unit cores connected to said data-and-command dispatcher, wherein n is any positive integer less than or equal to N;

wherein the graphics processing unit includes N data-and-command dispatchers;

wherein taking N as eight, the configured numbers of the graphics processing unit cores corresponding to the N data-and-command dispatchers are determined as follows:

one of the data-and-command dispatchers is connected to eight graphics processing unit cores, providing one one-to-eight connection;

one of the data-and-command dispatchers are connected to four graphics processing unit cores, providing one one-to-four connection in response to a situation where mi equals two and $m_{j+1}$ equals one;

two of the data-and-command dispatchers are connected to two graphics processing unit cores, providing two one-to-two connections in response to a situation where mi equals four and $m_{j+1}$ equals two; and four of the data-and-command dispatchers are connected to one graphics processing unit cores, providing four one-to-one connections in response to a situation where $m_j$ equals eight and $m_{j+1}$ equals four.

13. The electronic device according to claim 12, wherein the graphics processing unit further includes at least one data selector, and one of the graphics processing unit cores connecting with at least two data-and-command dispatchers is connected to the data-and-command dispatchers through the data selector.

14. The electronic device according to claim 12, wherein the number of physical layers of the graphics processing unit is configured according to the number of the data-and-command transmission lines.

* * * * *